(12) United States Patent
Kim et al.

(10) Patent No.: US 9,212,077 B2
(45) Date of Patent: Dec. 15, 2015

(54) MOLTEN GLASS DISCHARGING DEVICE

(75) Inventors: Deuk Man Kim, Daejeon (KR); Seok Mo Choi, Daejeon (KR); Hyun Jun Jo, Daejeon (KR); Hyun Je Cho, Daejeon (KR); Seung Chul Park, Daejeon (KR); Cheon Woo Kim, Daejeon (KR); Tae Won Hwang, Daejeon (KR)

(73) Assignee: KOREA HYDRO & NUCLEAR POWER CO., LTD., Gyeongsangbuk-do (KR)

( * ) Notice: Subject to any disclaimer, the term of this patent is extended or adjusted under 35 U.S.C. 154(b) by 274 days.

(21) Appl. No.: 13/884,052

(22) PCT Filed: Feb. 15, 2012

(86) PCT No.: PCT/KR2012/001135
§ 371 (c)(1),
(2), (4) Date: May 8, 2013

(87) PCT Pub. No.: WO2013/042841
PCT Pub. Date: Mar. 8, 2013

(65) Prior Publication Data
US 2013/0283862 A1    Oct. 31, 2013

(30) Foreign Application Priority Data

Sep. 19, 2011 (KR) .......................... 10-2011-0094292

(51) Int. Cl.
*C03B 5/26* (2006.01)
*C03B 5/00* (2006.01)
*G21F 9/30* (2006.01)

(52) U.S. Cl.
CPC . *C03B 5/26* (2013.01); *C03B 5/005* (2013.01); *G21F 9/305* (2013.01)

(58) Field of Classification Search
CPC .......... C03B 5/26; C03B 5/005; C03B 5/021; C03B 5/262
USPC .................................. 373/83–84; 65/126–129
See application file for complete search history.

(56) References Cited

U.S. PATENT DOCUMENTS 2,902,573 A * 9/1959 Guyer ............................ 219/383
3,213,495 A * 10/1965 Buehl ........................... 75/10.11
3,420,938 A * 1/1969 Ekdahl ............................ 373/84

(Continued)

FOREIGN PATENT DOCUMENTS

KR  10-2001-0101107 A  11/2001
KR     10-0432450 B1   5/2004
KR     10-0611358 B1   8/2006

*Primary Examiner* — Jodi C Franklin
(74) *Attorney, Agent, or Firm* — Rabin & Berdo, P.C.

(57) ABSTRACT

A molten glass discharging device provided in the bottom of a melting furnace of a waste vitrification apparatus so that the device can control the melting or cooling of a molten material. The molten glass discharging device, which is provided in the bottom of the furnace and controls discharging of a molten material, includes: an induction heating unit (110) having a discharging passage (10) along a discharging port formed in the bottom of the melting furnace; an induction coil (120) provided outside the induction heating unit (110); and a cooling unit (130) supporting the induction heating unit (110) and having a cooling conduit through which a cooling fluid circulates. The device can realize repeated discharging of the molten material by induction heating or cooling of the induction heating unit. Further, even when glass is adhered to the discharging port, the adhered glass can be easily discharged from the furnace.

4 Claims, 2 Drawing Sheets

(56) References Cited

U.S. PATENT DOCUMENTS

| | | | |
|---|---|---|---|
| 5,188,649 A | 2/1993 | Macedo et al. | |
| 5,340,372 A | 8/1994 | Macedo et al. | |
| 5,367,532 A * | 11/1994 | Boen et al. | 373/156 |
| 5,564,102 A * | 10/1996 | Igarashi et al. | 588/11 |
| 6,576,807 B1 | 6/2003 | Brunelot et al. | |
| 6,620,372 B1 | 9/2003 | Ladirat et al. | |
| 6,815,572 B1 | 11/2004 | Brunelot et al. | |
| 8,713,971 B2 * | 5/2014 | Tivey et al. | 65/135.6 |
| 2005/0016219 A1 * | 1/2005 | Rajala et al. | 65/537 |
| 2007/0068862 A1 * | 3/2007 | Sisemore | 210/222 |

\* cited by examiner

MOLTEN GLASS DISCHARGING DEVICE

TECHNICAL FIELD

The present invention relates, in general, to molten glass discharging devices and, more particularly, to a molten glass discharging device which is provided in the bottom of a melting furnace that constitutes a waste vitrification apparatus so that the device can control the melting or cooling of molten materials, thereby preventing glass from adhering to a molten material discharging port of the furnace and easily discharging adhered glass from the furnace.

BACKGROUND ART

Safe treatment, preservation and management of wastes, particularly, of hazardous wastes, such as radioactive wastes, are very important processes. As an example of the processes of treating, preserving and managing the wastes, waste vitrification that is a process of treating the wastes using glass has been proposed and used, in which radioactive wastes, sludge, contaminated soil, industrial wastes etc. are captured in a glass structure and are prevented from leaking to the surrounding environment, thereby permanently keeping the wastes in isolation.

To perform waste vitrification using a waste vitrification apparatus, a glass forming agent and wastes are melted in a melting furnace. Here, volatile components of the wastes can be exhausted through an exhaust treatment process and hazardous materials, such as radioactive atomic species and heavy metals, stay in the furnace for a predetermined lengthy period of time while being heated to form a part of a glass reticular structure, thereby forming a homogeneous molten glass mixture. Thereafter, the molten glass mixture is discharged from the furnace so that the poisonous materials are formed as a vitreous solid.

A variety of melting furnaces that are classified according to heating types have been proposed. Of the melting furnaces, a cold crucible induction melter (CCIM) is an induction melting furnace which includes a cylindrical melting chamber that has an insulating material placed between a plurality of metal sectors through which a coolant circulates. Further, a high frequency induction coil is provided at a location outside the melting chamber and supplies electricity so that materials contained in the melting chamber can be melted.

The above-mentioned cold crucible induction melter is provided with a molten material discharging part that functions to discharge materials after melting the materials. For example, U.S. Pat. No. 6,620,372 (Date of Patent: Sep. 16, 2003.) and Korean Patent No. 611358 (Date of Patent: Aug. 3, 2006.) disclose molten material discharging devices in which a discharging port is formed through the bottom of a melting chamber and a sliding gate is provided in the discharging port so that a molten material can be discharged through the discharging port by an on/off motion of the sliding gate.

As another example, a cylindrical discharging port that extends to a predetermined length is formed in the bottom of a melting furnace, and a heating unit, such as an induction coil, is provided in the cylindrical discharging port so that a molten material can be discharged from the melting furnace. However, this technique is problematic in that it requires a substantial lengthy period of time for cooling the cylindrical discharging port so that it is impossible to control the flow of the material to be discharged. Another problem of the technique resides in that, when glass is adhered to the cylindrical discharging port, it may not be easy to discharge the adhered glass from the furnace.

DISCLOSURE

Technical Problem

Accordingly, the present invention has been made keeping in mind the above problems occurring in the related art, and is intended to provide a molten glass discharging device, which is installed in a molten material discharging port that is formed in a bottom of a melting furnace so that the device can control the melting or cooling of molten materials that are discharged through the molten material discharging port, thereby preventing glass from adhering to the molten material discharging port and easily discharging adhered glass from the furnace.

Technical Solution

In an aspect, the present invention provides a molten glass discharging device provided in a bottom of a melting furnace so as to control discharging of a molten material from the melting furnace, the molten glass discharging device including: an induction heating unit having a discharging passage along a discharging port that is formed in the bottom of the melting furnace; an induction coil provided outside the induction heating unit; and a cooling unit supporting the induction heating unit and having a cooling conduit through which a cooling fluid circulates.

In the molten glass discharging device of the present invention, the induction heating unit is characterized in that it includes two or more cylindrical heating elements that are symmetrically arranged along the discharging passage.

Further, in the molten glass discharging device of the present invention, the cooling unit is characterized in that it includes a pair of cooling units that are symmetrically arranged on opposite lengthwise ends of the induction heating unit so that the cooling units are parallel to each other in directions perpendicular to the induction coil.

Further, the molten glass discharging device of the present invention is characterized in that it further includes a magnetic field shielding element provided outside the induction coil so as to realize magnetic field shielding. Further, the magnetic field shielding element may include a ferrite core. Further, the magnetic field shielding element may be provided with a second cooling conduit through which a cooling fluid circulates.

Advantageous Effects

As described above, the molten glass discharging device of the present invention includes: an induction heating unit that has a discharging passage along a discharging port which is formed in the bottom of the melting furnace; an induction coil that is provided outside the induction heating unit; and a cooling unit that supports the induction heating unit and has a cooling conduit through which a cooling fluid circulates. The molten glass discharging device can realize repeated discharging of the molten material by induction heating or cooling of the induction heating unit. Further, even when glass is adhered to the discharging port, the device can easily discharge the adhered glass from the furnace so that the device can improve the molten glass discharging efficiency.

Figure 1:
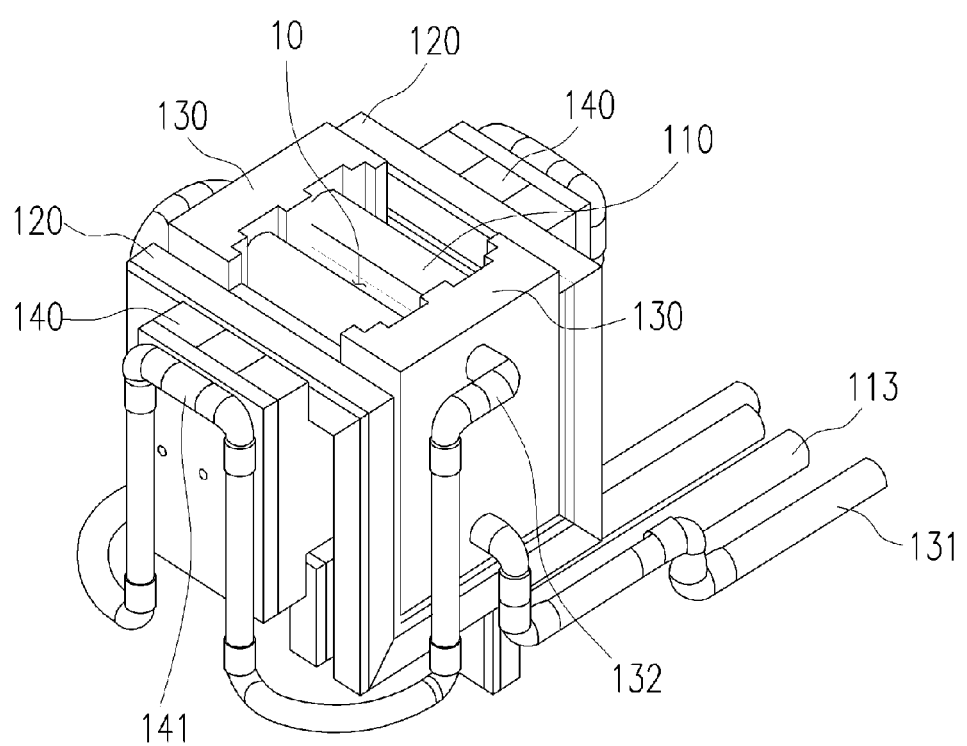
FIG. 1 is a perspective view illustrating a molten glass discharging device according to the present invention.

Description of reference characters of important parts

| 10: discharging passage | 110: induction heating unit |
| 120: induction coil | 130: cooling unit |
| 131: cooling conduit | |

BEST MODE

Hereinbelow, preferred embodiments of the present invention will be described in detail with reference to the accompanying drawings.

Figure 2:
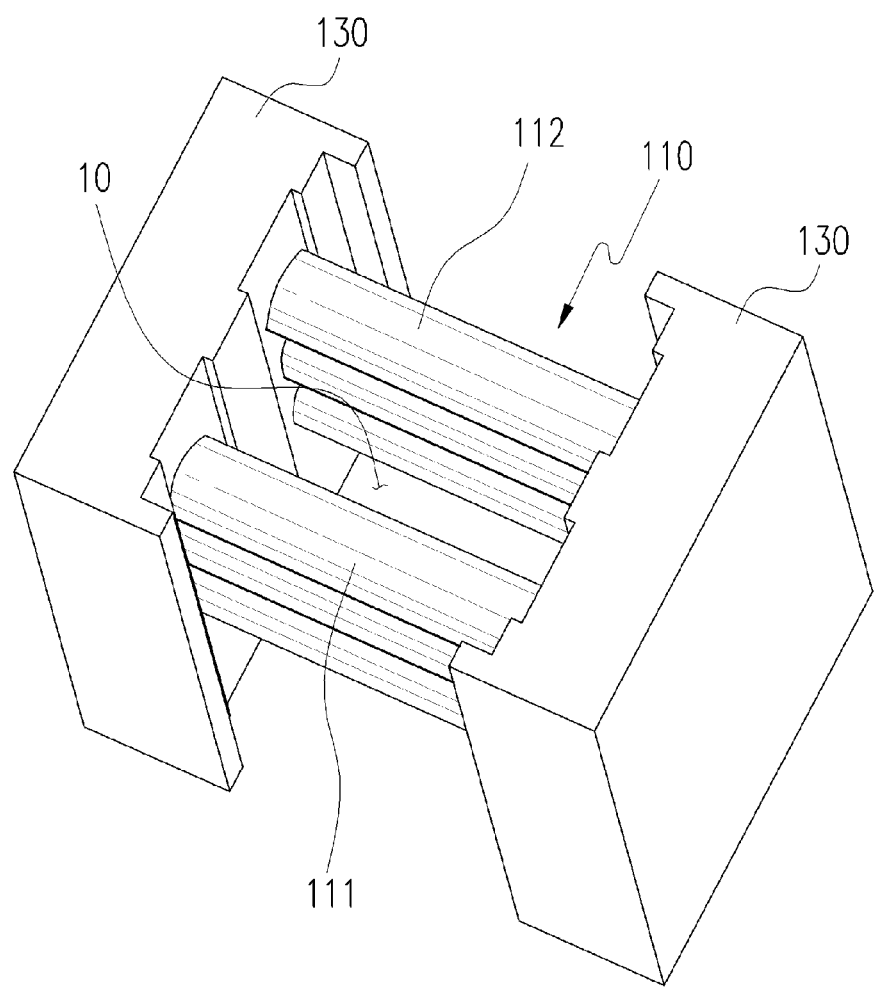
FIG. 2 is a view illustrating a preferred embodiment of an induction heating unit of the molten glass discharging device according to the present invention.

As shown in FIGS. 1 and 2, a molten glass discharging device according to the present invention is provided in the bottom of a melting furnace, and controls the discharging of a molten material from the melting furnace. The molten glass discharging device includes: an induction heating unit 110 that has a discharging passage 10 along a discharging port which is formed in the bottom of the melting furnace; an induction coil 120 that is provided outside the induction heating unit 110; and a cooling unit 130 that supports the induction heating unit 110 and has a cooling conduit through which a cooling fluid circulates.

The induction heating unit 110 is an element in which an induced current is induced in a high frequency magnetic field so that heat is generated. To discharge the molten material in a downward direction, the discharging passage 10 is provided in the induction heating unit.

In the present invention, a variety of heating conductors, such as a plane-type heating element or a stick-type heating element made of a conductor, may be used as the induction heating unit. However, it is preferred that the induction heating unit be formed by two or more cylindrical heating elements 111 which are symmetrically and horizontally arranged in parallel to each other along the discharging passage 10.

As shown in FIG. 2, two groups of cylindrical heating elements are symmetrically arranged, in which three cylindrical heating elements are arranged in each side in such a way that one is arranged over another. The discharging passage 10 through which the molten material (molten glass) is discharged is formed between the two cylindrical heating element groups 111 and 112. Here, it should be understood that the number of cylindrical heating elements may be increased or reduced.

The induction heating unit 110 is induction-heated by the induction coil that is provided outside the induction heating unit so that the induction heating unit generates high-temperature heat. Here, the induction heating unit may be formed using an ultrahigh temperature heating material, such as MoSi2, iridium and platinum metal.

Reference numeral 111 denotes an induced current supply line that is connected to the induction coil 120 and supplies electricity.

The induction coil 120 may be formed using a high frequency coil that generates a high-frequency wave. Here, two induction coils are symmetrically arranged at opposite locations outside the induction heating unit 110.

It is preferred that the induction coils be arranged in such a way that the magnetic fluxes thereof do not interlink with the magnetic flux of a main induction coil that is installed in the cold crucible induction melting furnace. To realize this object, the induction coils may be arranged in parallel to a molten material discharging direction in which the molten material is discharged from the cold crucible induction melting furnace.

The cooling unit 130 supports the induction heating unit 110 and is provided with the cooling conduit therein for realizing the circulation of the cooling fluid.

As shown in FIG. 2, the cooling unit 130 has a square plate shape and is provided with the cooling conduit therein so that the cooling fluid can circulate. Here, two cooling units 130 are symmetrically arranged on opposite lengthwise ends of the induction heating unit 110 so that the cooling units can firmly support the induction heating unit 110 in directions perpendicular to the induction coils 120.

Each cooling unit 130 is connected to an outside circulation system by a first pipe 131 so that the cooling fluid can circulate through the cooling unit.

In the present invention, a magnetic field shielding element 140 may be provided outside each induction coil 120 so as to realize magnetic field shielding. To efficiently realize the magnetic field shielding, a ferrite core may be used as the magnetic field shielding element.

Here, the magnetic field shielding element 140 may be placed closely outside each induction coil 120 so that the magnetic field shielding element 140 can cover the magnetic flux of the main induction coil that is provided in the cold crucible induction melting furnace so as to heat the interior of the furnace, and can shield surrounding metal materials from the magnetic flux.

Further, the magnetic field shielding element 140 may be provided with a second cooling conduit so that a cooling fluid can circulate through the second cooling conduit and can restrict heating of the magnetic field shielding element.

The cooling fluid that flows through the above-mentioned second cooling conduit may be supplied by an additional cooling fluid circulation system that is different from the circulation system for supplying a cooling fluid to the cooling unit 130. However, as shown in FIG. 1, a second cooling conduit 141 that is connected to the cooling unit 130 through a second pipe 132 may be arranged at a location close to the magnetic field shielding element 140 so that a cooling fluid can be supplied both to the cooling unit and to the second cooling conduit by one cooling fluid circulation system.

The above-mentioned molten glass discharging device of the present invention is installed in the bottom of the cold crucible induction melting furnace in such a way that the discharging passage 10 of the induction heating unit 110 can be aligned with a discharging port (not shown) of the melting furnace.

Thereafter, an induced current is supplied from the outside through the induced current supply line 113 so that a high frequency wave is generated in each induction coil 120. The high frequency current that has been applied to the induction coils 120 induces an induced current to the induction heating unit 110 that is placed between the induction coils 120 so that the induction heating unit 110 can generate heat.

Accordingly, solid glass that is placed around the discharging port of the bottom of the cold crucible induction melting furnace is melted and the molten material is discharged from the cold crucible induction melting furnace through the discharging passage 10.

When the molten material is completely discharged from the cold crucible induction melting furnace or when it is required to stop the discharging of the molten material, the electricity supply to the induction coils 120 is stopped and the cooling fluid is supplied to the cooling units 130, thereby cooling the molten material in the furnace. When the molten material is cooled and becomes solidified, the solidified material closes the discharging port of the cold crucible induction melting furnace and stops the discharging of the material.

The above-mentioned molten glass discharging device of the present invention is advantageous in that electricity is supplied to the induction coil and the molten glass can be easily discharged from the cold crucible induction melting furnace. Particularly, even when glass is adhered to the discharging port of the bottom of the cold crucible induction melting furnace, the adhered glass can be easily discharged from the furnace by heat of a heating element. Further, it is possible to control the cooling fluid that is supplied to the cooling unit which supports the induction heating unit so that the present invention can easily control the discharging of the molten material.

Although the embodiments of the present invention have been disclosed for illustrative purposes, those skilled in the art will appreciate that the scope and spirit of the invention are not limited to the accompanying drawings or to the embodiments.

What is claimed is:

1. A molten glass discharging device provided in a bottom of a melting furnace so as to control discharging of a molten material from the melting furnace, the molten glass discharging device comprising:

an induction heating unit having a discharging passage along a discharging port that is formed in the bottom of the melting furnace;

an induction coil provided outside the induction heating unit;

a cooling unit supporting the induction heating unit and having a first cooling conduit through which a cooling fluid circulates; and a magnetic field shielding element provided outside the induction coil for shielding magnetic field, wherein the magnetic field shielding element is provided with a second cooling conduit through which a cooling fluid circulates.

2. The molten glass discharging device as set forth in claim 1, wherein the induction heating unit comprises two or more cylindrical heating elements that are symmetrically arranged along the discharging passage.

3. The molten glass discharging device as set forth in claim 1, wherein the cooling unit comprises a pair of cooling units that are symmetrically arranged on opposite lengthwise ends of the induction heating unit so that the cooling units are parallel to each other in directions perpendicular to the induction coil.

4. The molten glass discharging device as set forth in claim 1, wherein the magnetic field shielding element comprises a ferrite core.

* * * * *